Dec. 6, 1955  H. A. JACOT  2,725,768
COUNTERSINKING TOOL
Filed April 1, 1955
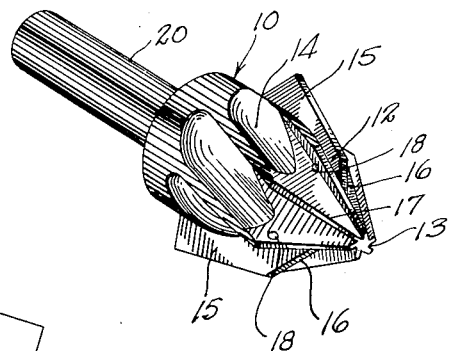
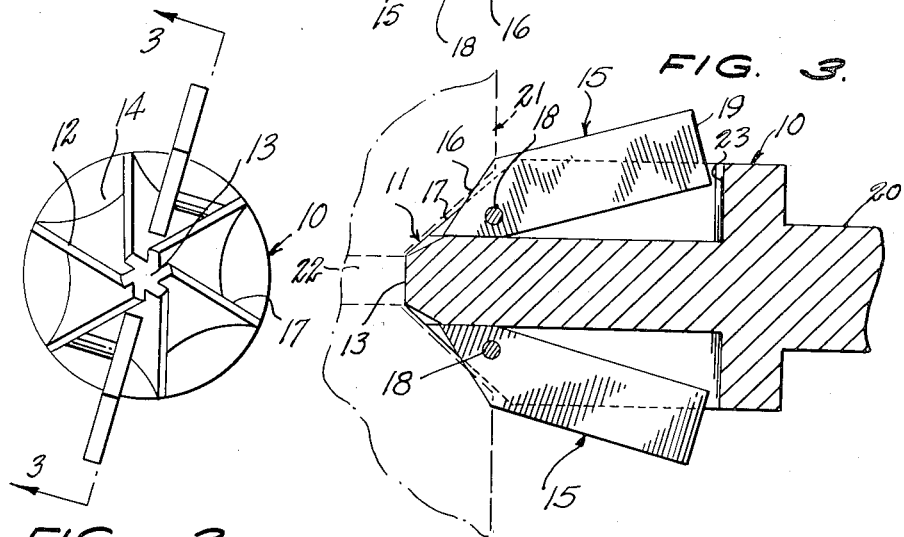
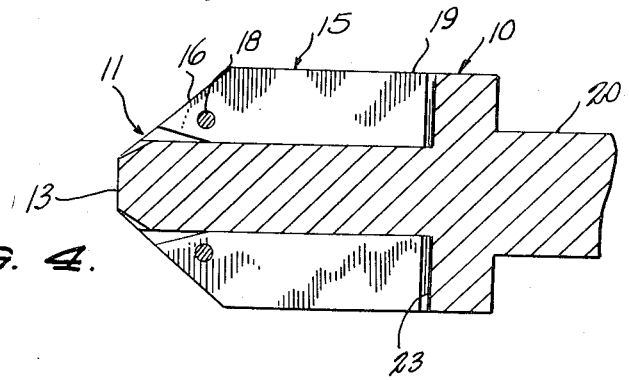
INVENTOR.
HENRI A. JACOT,
BY
McMorrow, Berman & Davidson
ATTORNEYS.

United States Patent Office 2,725,768
Patented Dec. 6, 1955

2,725,768

COUNTERSINKING TOOL

Henri A. Jacot, Rochester, N. Y.

Application April 1, 1955, Serial No. 498,622

2 Claims. (Cl. 77—73.5)

The present invention relates to countersinking tools for metal working and woodworking.

The primary object of the present invention is to provide a countersinking tool for use while working metal or wood and one which automatically limits the depth of the countersinking cut.

Another object of the present invention is to provide a countersinking tool having a depth gauge incorporated in its construction for automatically stopping the cutting action of the blades of the tool when the proper depth of countersink has been reached.

A further object of the present invention is to provide a combination countersinking tool and depth gauge which is sturdy in construction and has few parts, and one which is economical to manufacture and assemble in any size desired.

These and other objects and advantages of the present invention will be fully apparent from the following description when taken in connection with the annexed drawings, in which:

Figure 1 is a view in perspective of the countersinking tool of the present invention with the depth gauge dogs shown in extended position;

Figure 2 is an end view of the tool of the present invention showing the dogs in extended position;

Figure 3 is a side view partially in cross section on line 3—3 of Figure 2; and

Figure 4 is a similar side view in cross section showing the dogs in retracted position.

Referring in greater detail to the drawing in which like numerals indicate like parts throughout the several views, the present invention consists in a countersinking tool having a depth gauge means and comprising a cutting head 10 having a plurality of blades 12 forming a conically shaped cutting surface or face 11, each of the blades diverging outwardly from the apex 13 of the cutting face 11. The cutting head 10 is also provided with a like number of spirally arranged flutes 14 extending rearwardly from the cutting face 11, one between each blade 12, from the apex 13 to a point spaced from the rear end of the cutting head 10.

A pair of dogs 15 is arranged on the cutting head 10, each having an abutment face 16 on one end thereof contiguous with the cutting edges 17 of the adjacent blades 12. A pivot pin 18 connects each dog 15 at a point intermediate the ends of the abutment face 16 to the cutting head 10 for swinging movement about an axis arranged transversely of the blades 12 from the nested position, Figure 4, in which position the abutment face 16 of each dog is contiguous with the cutting edges 17 of the adjacent blades 12 to the position shown in Figures 1, 2, and 3 in which the dogs 15 have their other ends 19 extended outwardly from the sides of the cutting head 10.

When the ends 19 of the dogs 15 are so extended, the portion of the abutment face 16 adjacent the apex 13 of the cutting head 10 retracts from the contiguous position to a position rearwardly of and non-contiguous with the cutting edges 17 of the adjacent blades and the portions of the abutment face 16 remote from the apex 13 of the cutting head 10 and on the other side of the pivot pin 18 then extend forwardly of and are non-contiguous with the cutting edges of the adjacent blades.

The cutting head 10 is mounted on a shank 20 so that the tool may be secured in a drill or other rotative machine and a work piece may be engaged and countersunk. When the cutting head 10 is rotated, the dogs 15 are moved to the extended position by centrifugal force and engage the work piece when the countersink cut has been completed so that the dogs are moved to the nested position, Figure 4, at which both portions of the abutment face 16 of each dog 15 return to the contiguous position and abut against the work piece, preventing further cutting action of the blades 12.

The work piece is shown in dotted lines in Figure 3, as indicated by the reference numeral 21, and shows the depth of the countersunk hole which may be formed in the work piece by the tool of the present invention before the abutment face of each of the dogs 15 abuts the work piece and stops further cutting action of the blades. Eyelet holes, indicated in Figure 3 by the reference numeral 22, are first provided in the work piece 21 in order that the tool of the present invention may form the countersunk holes desired for machine screws, wood screws, and the like, such as are needed in various metal working or woodworking industries.

The countersinking tool of the present invention may be constructed in any size desired and for any angle of countersunk hole that is needed, it being only necessary to provide slots as indicated by the reference numeral 23 in Figure 3 and 4, in which the dogs are slidable from the nested position to the extended position. Suitable clearances may be allowed for the working of each of the dogs in its associated slot and suitable clearances for free rotation may be provided in the dimensions of the hole through each of the dogs and the pivot pin upon which it moves. The material from which the dogs are preferably fabricated should be steel of sufficient hardness so as to withstand hte frictional wear when abutting the work piece in which the countersunk holes are being made.

What is claimed is:

1. A countersinking tool comprising a head, means on said head for attaching same to a rotative element, a plurality of blades arranged about said head so as to provide a conically shaped cutting surface, and means for determining the depth of a countersink to be cut operatively connected to said cutting surface, said means embodying at least a pair of dogs each having an abutment face on one end thereof contiguous with said cutting surface, said dogs being pivotally connected to opposite sides of said head and each being movable in response to centrifugal force when said head is rotated from the position with said abutment face contiguous with said cutting surface to a position at which said abutment face is non-contiguous with said cutting surface, said dogs being adapted to engage a work piece upon completion of a countersinking cut so as to move said abutment faces to the contiguous position in abutment with said work piece thereby preventing further cutting of the latter.

2. A countersinking tool comprising a head, means on said head for attaching same to a rotative element, a plurality of blades arranged about said head so as to provide a conically shaped cutting surface, and means for determining the depth of a countersink to be cut operatively connected to said cutting surface, said means embodying at least a pair of dogs each having an abutment face on one end thereof contiguous with said cutting surface, said dogs being pivotally connected to opposite sides of said head and each being movable about an axis transverse to said blades in response to centrifugal force when said head is rotated from the position with said abutment face contiguous with said cutting surface to a position at which said abutment face is non-contiguous with cutting surface, said dogs being adapted to engage a work piece upon completion of a countersinking cut so as to move said abutment faces to the contiguous position in abutment with said work piece thereby preventing further cutting of the latter.

References Cited in the file of this patent

UNITED STATES PATENTS 2,317,615   Johnson ---------------- Apr. 27, 1943